(12) United States Patent
Song et al.

(10) Patent No.: US 10,957,321 B2
(45) Date of Patent: Mar. 23, 2021

(54) ELECTRONIC DEVICE AND CONTROL METHOD THEREOF

(71) Applicant: SAMSUNG ELECTRONICS CO., LTD., Suwon-si (KR)

(72) Inventors: Young-suk Song, Suwon-si (KR);
Han-ki Kim, Suwon-si (KR);
Dong-hyun Lim, Seoul (KR);
Hae-kwang Park, Suwon-si (KR);
Jun-ho Sohn, Suwon-si (KR);
Woo-jung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 127 days.

(21) Appl. No.: 16/319,545

(22) PCT Filed: Jun. 27, 2017

(86) PCT No.: PCT/KR2017/006790
§ 371 (c)(1),
(2) Date: Jan. 22, 2019

(87) PCT Pub. No.: WO2018/016760
PCT Pub. Date: Jan. 25, 2018

(65) Prior Publication Data
US 2019/0332345 A1   Oct. 31, 2019

Related U.S. Application Data

(60) Provisional application No. 62/365,076, filed on Jul. 21, 2016.

(30) Foreign Application Priority Data

Mar. 22, 2017  (KR) .................. 10-2017-0036304

(51) Int. Cl.
*G10L 15/22* (2006.01)
*G06F 16/63* (2019.01)
(Continued)

(52) U.S. Cl.
CPC .............. *G10L 15/22* (2013.01); *G06F 3/16* (2013.01); *G06F 16/63* (2019.01); *G10L 15/02* (2013.01);
(Continued)

(58) Field of Classification Search
CPC ....................................................... G10L 15/22
See application file for complete search history.

(56) References Cited

U.S. PATENT DOCUMENTS 8,521,531 B1 *   8/2013   Kim ................... G06F 16/7844
                                                           704/252
8,537,983 B1 *   9/2013   Haggerty .............. H04M 11/00
                                                           379/88.14

(Continued)

FOREIGN PATENT DOCUMENTS

EP          2 947 635          11/2015
KR     10-2012-0038654          4/2012

(Continued)

OTHER PUBLICATIONS

Extended European Search Report dated Mar. 14, 2019 in counterpart European Patent Application No. 17831233.6.

(Continued)

*Primary Examiner* — Douglas Godbold
(74) *Attorney, Agent, or Firm* — Nixon & Vanderhye, P.C.

(57) ABSTRACT

An example electronic device is disclosed. The electronic device includes a communication circuit for communicating with a server storing information on a plurality of clips and storing keywords by the plurality of clips; an output device;

(Continued)

an input device; and a processor which, when a voice uttered by a user is received via the input device, transmits a clip request signal to the server, based on a keyword included in the received uttered voice and information on content outputted by the output device, and outputs a short clip via the output device, based on information on the short clip received from the server in response to the request signal.

20 Claims, 12 Drawing Sheets

(51) Int. Cl.
*G06F 3/16* (2006.01)
*G10L 15/02* (2006.01)
*G10L 15/06* (2013.01)

(52) U.S. Cl.
CPC .. *G08C 2201/31* (2013.01); *G10L 2015/0638* (2013.01)

(56) References Cited

U.S. PATENT DOCUMENTS

| | | | |
|---|---|---|---|
| 8,793,583 | B2 | 7/2014 | McKoen et al. |
| 9,230,543 | B2 | 1/2016 | Kim et al. |
| 9,547,716 | B2 | 1/2017 | Kim |
| 2004/0210443 | A1* | 10/2004 | Kuhn ................. G10L 15/22 704/276 |
| 2006/0075324 | A1 | 4/2006 | Whitten et al. |
| 2012/0066226 | A1* | 3/2012 | Moshrefi ............ G06F 16/5838 707/740 |
| 2012/0254917 | A1 | 10/2012 | Burkitt et al. |
| 2013/0159003 | A1 | 6/2013 | Kim et al. |
| 2013/0282713 | A1 | 10/2013 | Lawrence |
| 2014/0067402 | A1 | 3/2014 | Kim |
| 2015/0186511 | A1 | 7/2015 | Trollope et al. |
| 2016/0092447 | A1* | 3/2016 | Venkataraman ........ G06F 16/43 707/765 |
| 2016/0180840 | A1 | 6/2016 | Siddiq et al. |
| 2018/0190279 | A1* | 7/2018 | Anderson ........... G10L 15/1822 |

FOREIGN PATENT DOCUMENTS

| | | |
|---|---|---|
| KR | 10-2013-0082835 | 7/2013 |
| KR | 10-2014-0028540 | 3/2014 |
| KR | 10-1487533 | 1/2015 |
| KR | 10-2015-0077580 | 7/2015 |
| KR | 10-2016-0002580 | 1/2016 |

OTHER PUBLICATIONS

International Search Report for PCT/KR2017/006790 dated Oct. 17, 2017, 2 pages.

Written Opinion of the ISA for PCT/KR2017/006790 dated Oct. 17, 2017 and English-language translation, 11 pages.

* cited by examiner

ELECTRONIC DEVICE AND CONTROL METHOD THEREOF

This application is the U.S. national phase of International Application No. PCT/KR2017/006790 filed Jun. 27, 2017 which designated the U.S. and claims priority to U.S. Provisional Application No. 62/365,076 filed Jul. 21, 2016 and KR Patent Application No. 10-2017-0036304 filed Mar. 22, 2017, the entire contents of each of which are hereby incorporated by reference.

TECHNICAL FIELD

The present disclosure pertains to an electronic device and a controlling method thereof, and more particularly, to an electronic device which provides a short clip and a controlling method thereof.

BACKGROUND ART

Recently, various types of multimedia devices have been developed due to the development of electronic technology. In particular, multimedia devices such as TVs, PCs, laptop computers, tablet PCs, smart phones and the like are widely used in most households.

In addition, in order to meet the needs of users who desire various functions, an effort is being made to develop a new personal assistant service (Smart Assistant) that combines voice recognition with a multimedia device.

However, according to the related art, a text-based search result for a user's query is only provided as an unnatural voice using a TTS.

Further, when the video or audio content is included in the search result, the content is provided as an original. In this case, since the original content includes a plurality of parts irrelevant to the user's question, there is a problem that the search result that is meaningless to a user is accepted.

Therefore, there is a necessity that only parts related to a user's query from the original content are provided as a search result.

SUMMARY

The object of the present disclosure is to provide an electronic device which provides a short clip regarding an original content based on a keyword and a controlling method thereof.

Means for Solving Problems

The electronic device according to an exemplary embodiment includes a communicator configured to communicate with a server for storing information on a plurality of short clips and keywords by the plurality of short clips; an outputter; an inputter; and a processor configured to: in response to a user's uttered voice being received through the inputter, transmit a short clip request signal to the server based on a keyword included in the received uttered voice and information on a content output from the outputter, and output a short clip through the outputter based on information on a short clip received from the server according to the request signal.

The information on the plurality of short clips may include at least one of information on a position in which the plurality of short clips are stored and time section including the keyword, and the processor, in response to information regarding a short clip being received from the server according to the request signal, outputs the short clip based on the received information.

Each of the plurality of short clips may be a video content or an audio content which is generated by editing a portion including a specific keyword from a specific content.

The processor, in response to additional information regarding the short clip being received, may provide additional information regarding the short clip, and the additional information regarding the short clip may include at least one of a title and a genre of an original content, broadcast time of the original content, generation time of the short clip, broadcaster information of the original content, and the keyword.

The outputter may include at least one of a display and a speaker.

According to another exemplary embodiment, the outputter may include only a speaker, and the processor provides additional information on the short clip as an audio through the speaker.

The outputter may include at least one of a display and a speaker, and the processor additionally may transmit a short clip request signal related to the keyword to the server based on a keyword which is repeated for a predetermined times or more during a predetermined time from audio that is output through the speaker.

The processor may provide additional response information on the uttered voice along with the short clip based on a keyword included in the received uttered voice.

The processor may transmit the request signal which includes the keyword and user information to the server and receive a short clip relating to the keyword and the user information from the server.

The processor, in response to the uttered voice being received, may transmit the received uttered voice to the voice recognition server or the server, and transmit a short clip request signal to the server based on the keyword and information on the content received from the voice recognition server or the server.

According to an exemplary embodiment, a controlling method of an electronic device which communicates with a server for storing information on a plurality of short clips and keywords by the plurality of short clips includes outputting a content; receiving a user's uttered voice; in response to the uttered voice being received, transmitting a short clip request signal to the server based on a keyword included in the received uttered voice and information on a content output from the outputter; and outputting a short clip through the outputter based on information on a short clip received from the server according to the request signal.

The information on the plurality of short clips may include at least one of information on a position in which the plurality of short clips are stored and time section including the keyword, and wherein the outputting comprises, in response to information regarding a short clip being received from the server according to the request signal, outputting the short clip based on the received information.

Each of the plurality of short clips may be a video content or an audio content which is generated by editing a portion including a specific keyword from a specific content.

The outputting the short clip may include, in response to additional information regarding the short clip being received, providing additional information regarding the short clip, and the additional information regarding the short clip may include at least one of a title and a genre of an original content, broadcast time of the original content, generation time of the short clip, broadcaster information of the original content, and the keyword.

The outputting the short clip may include providing additional information on the short clip as an audio through the speaker.

The electronic device includes at least one of a display and a speaker, and the transmitting may include additionally transmitting a short clip request signal related to the keyword to the server based on a keyword which is repeated for a predetermined times or more during a predetermined time from audio that is output through the speaker.

The outputting the short clip may include providing additional response information on the uttered voice along with the short clip based on a keyword included in the received uttered voice.

The transmitting may include transmitting the request signal which includes the keyword and user information to the server and receiving a short clip relating to the keyword and the user information from the server and outputting the same.

The transmitting may include transmitting the received uttered voice to the voice recognition server or the server, and transmitting a short clip request signal to the server based on the keyword and information on the content received from the voice recognition server or the server.

A system including the electronic device and a server according to an exemplary embodiment includes the electronic device which includes a server that generates information on a plurality of short clips based on each keyword of a plurality of original contents and stores information on the generated plurality of short clips and keywords by the plurality of short clips, and when a user's uttered voice is received, based on the keywords included in the received uttered voice and information on the content which the electronic device outputs, transmits a short clip request signal to the server, and outputs a short clip based on information on the short clip received form the server according to the request signal.

Effect of Invention

According to various embodiments of the present disclosure as described above, a short clip for the original content is provided based on the keyword included in the uttered voice of the user, so that the user's convenience can be increased.

BEST MODE OF THE INVENTION

Detailed Description

Figure 1:
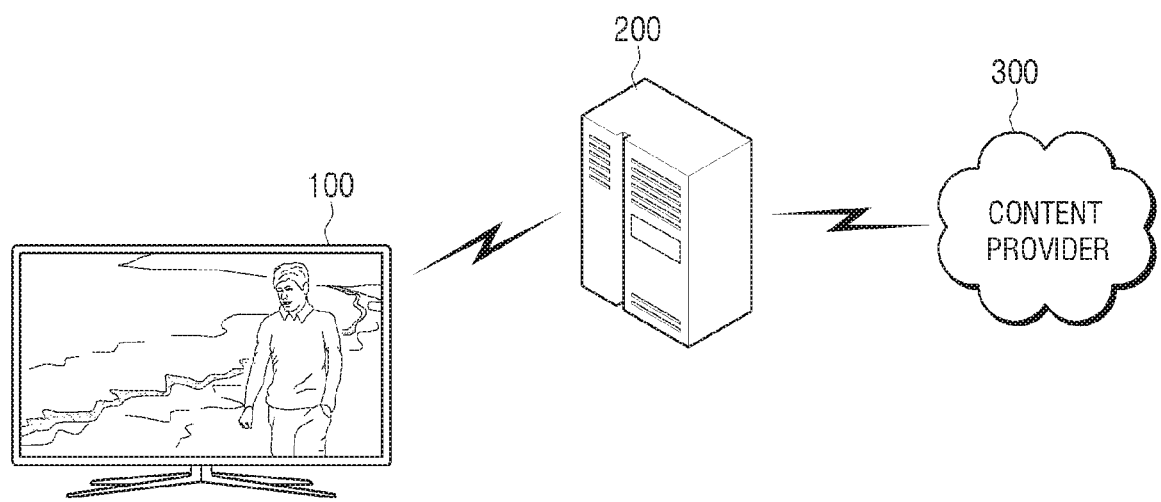
FIG. 1 is a view to describe a system to provide a short clip according to an exemplary embodiment.

Hereinafter, the present disclosure will be described in detail with reference to the drawings. In the following description of the present disclosure, detailed description of known functions and configurations incorporated herein will be omitted when it may make the subject matter of the present invention rather unclear. In addition, the following embodiments can be modified into various other forms, and the scope of the technical idea of the present disclosure is not limited to the following examples. Rather, these embodiments are provided so that this disclosure will be more thorough and complete, and will fully convey the scope of the present disclosure to those skilled in the art.

Also, "comprising" means that other components may be included, rather than excluding other components, unless specifically stated otherwise. Further, various elements and regions in the drawings are schematically drawn. Accordingly, the spirit of the present disclosure is not limited by the relative size or spacing depicted in the accompanying drawings.

FIG. 1 is a view to describe a system to provide a short clip according to an exemplary embodiment.

The electronic device 100 may be implemented as various types of devices that output content using at least one of a display and a speaker. Accordingly, the electronic device 100 may be implemented as a digital TV, but the present disclosure is not limited thereto and may be implemented as various types of devices having a display function such as a PC, a mobile phone, a tablet PC, a PMP, a PDA, and a navigator. In addition, it is needless to say that the electronic device 100 may be implemented as an audio output device without a display function. In this case, the content may be outputted as an audio signal through the speaker. Hereinafter, for convenience of description, it is assumed that the electronic device 100 is implemented as a digital TV. An exemplary embodiment in which the electronic device 100 includes only a speaker without a display function will be described in detail with reference to FIG. 10.

The electronic device 100 according to an embodiment of the present disclosure can receive the uttered voice of the user and obtain the keyword included in the received uttered voice. Specifically, the electronic device 100 can transmit the received uttered voice to a voice recognition server (not shown), and receive the key word included in the uttered voice from the voice recognition server. However, the present disclosure is not limited thereto, and the electronic device 100 may analyze the user's uttered voice to obtain keywords.

The server 200 according to an exemplary embodiment may provide a short clip and analyze the uttered voice and can be used as a voice recognition server which transmits the keyword included in the uttered voice to the electronic device 100.

The electronic device 100 may transmit a short clip request signal to the server 200 based on the keyword included in the received uttered voice and information on the content output by the electronic device 100. In this case, the electronic device 100 can receive the information about the short clip corresponding to the request signal from the server 200, and output the short clip based on the received information. Here, the information on the short clip may be at least one of information on a short clip, a position where the short clip is stored, and information on a time period including the keyword. For example, when a time interval including a keyword is received, the electronic device 100 may reproduce and output only a time interval including a specific keyword in the content based on the time interval.

The server 200 can store information on a plurality of short clips and keywords for a plurality of short clips. Specifically, the server 200 can receive the content from a content provider 300 and generate a short clip from the received content. For example, the server 200 may receive broadcast content from a broadcaster and may generate a plurality of short clips from the received broadcast content. Hereinafter, for convenience of description, the content received from the content provider 300 is referred to as an original content.

A short clip refers to an image obtained by editing a specific part or a part of a received original content, and in some cases, a plurality of contents may be combined. For example, a specific portion or some of each of the plurality of contents may be obtained, and the obtained portions may be combined to generate a short clip.

According to an exemplary embodiment of the present disclosure, the server 200 may analyze the audio signal of the original content and edit the original content in units of Endpoint Detection (EPD). Here, the EPD means an algorithm for analyzing the audio signal of the original content and detecting the start and end points of the audio in real time.

In addition, the server 200 can acquire keywords by analyzing the voice included in each of the edited images in units of EPD. Accordingly, the server 200 can acquire and store keywords matched to each of a plurality of edited videos and a plurality of videos edited in units of EPD from one original content. Here, the keyword matched to the edited video may be at least one.

According to an embodiment of the present disclosure, when the server 200 analyzes the audio signal included in the edited video to acquire a plurality of keywords, a plurality of keywords may be matched to one edited video and stored in the server. In the meantime, the original content is not necessarily edited in EPD units, and the server 200 may edit the original content based on various voice detection algorithms to generate a plurality of short clips. The method of generating keywords for the short clip and the short clip of the server 200 will be described in detail with reference to FIG. 3. Hereinafter, for convenience of description, an edited video obtained from the original content is named as a short clip.

The short clip may be a video in which a specific part of the original content, for example, a part including a specific keyword is edited within a predetermined time (for example, within three minutes). However, it is needless to say that the short clip is not limited to the video content but can be generated by editing the sound content. Furthermore, since the playback time of the short clip can be changed according to the setting and voice detection algorithm, it is not limited within three minutes.

In the meantime, the server 200 may generate and store information about a short clip at the time of generating a short clip. Here, the information on the short clip may include at least one of a position where the short clip is stored and a time interval including the specific keyword. Specifically, the server 200 may acquire a keyword by analyzing an audio signal included in the short clip, and may store a keyword matching the short clip and the short clip. Accordingly, the server 200 can store a plurality of short clips and a plurality of short clip-specific keywords. In addition, the server 200 according to an embodiment of the present disclosure may store the title, the genre, the broadcast time of the original content, the generation time of the short clip, and the broadcast station information of the original content on the basis of the metadata of the original content along with the short clip.

The electronic device 100 according to an exemplary embodiment of the present disclosure analyzes a uttered voice of a user and transmits a short clip request signal related to a keyword included in a uttered voice to a server, and the server 200 may transmit a short clip regarding the keyword included in the received request signal to the electronic device 100. In addition, the electronic device 100 may display the received short clip and provide it to the user.

Meanwhile, as described above, the electronic device 100 according to an embodiment of the present disclosure may transmit a user's uttered voice to a voice recognition server and receive a keyword included in the uttered voice from the voice recognition server. It is also possible that the server 200 providing the short clip receives the voice uttered by the user and transmits the keyword included in the uttered voice to the electronic device 100. That is, the voice recognition server or server 200 may be implemented to perform speech recognition in the process of converting a received voice into text and acquiring a keyword in the converted text, when an uttered voice of the user is received.

Hereinbelow, referring to the block diagram illustrating the specific configuration of the electronic device 100 will be described regarding the exemplary embodiment of the present disclosure.

Figure 2A:
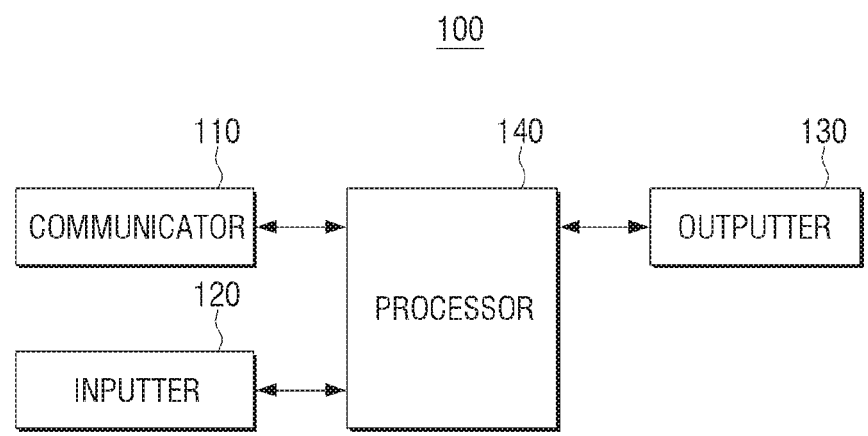
FIGS. 2A and 2B are block diagrams illustrating a configuration of an electronic device according to an exemplary embodiment.
Figure 2B:
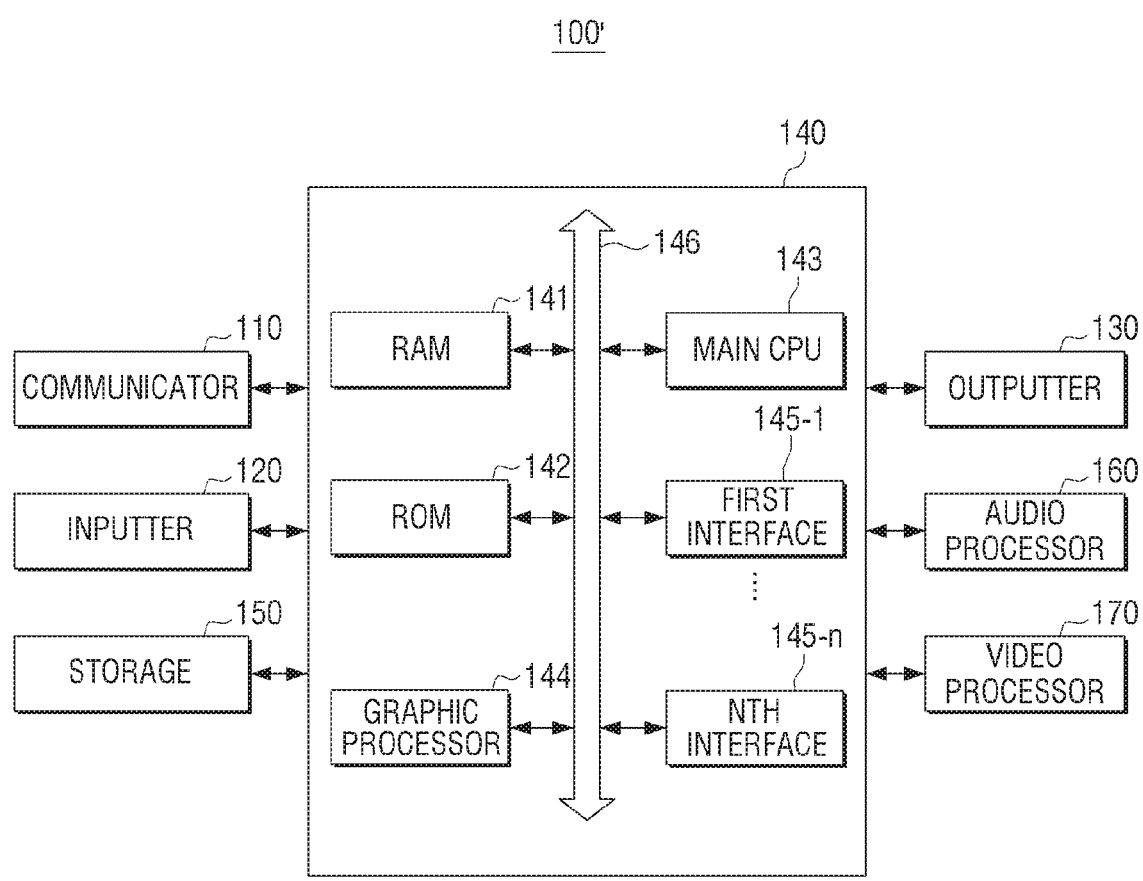

FIGS. 2A and 2B are block diagrams illustrating a configuration of an electronic device according to an exemplary embodiment.

Referring to FIG. 2A, the electronic device 100 includes the communicator 110, the inputter 120, the outputter 130, and the processor 140.

The communicator 110 performs communication with an external device according to various types of communication methods.

In particular, the communicator 110 can communicate with the server 200 that stores keywords for a plurality of short clips and a plurality of short clips using at least one of a wired/wireless scheme. Also, the communicator 110 can perform communication with the voice recognition server. Here, the communicator 110 may include various communication chips such as a chip, a Bluetooth chip, a wireless communication chip, and an NFC chip.

As will be described later, the communicator 110 can transmit an uttered voice received by the voice recognition server and receive a keyword included in the uttered voice when the user's uttered voice is received through the inputter 120. Meanwhile, when the server 200 is used as a voice recognition server, the communicator 110 may transmit the received uttered voice to the server 200 and receive the keyword from the server 200. However, the present disclosure is not limited thereto, and it is needless to say that the electronic device 100 may acquire a keyword by performing voice recognition of a user's uttered voice, without performing communication with the voice recognition server or the server 200.

Meanwhile, the communicator 110 according to an exemplary embodiment of the present disclosure may transmit a signal requesting a short clip to the server 200, and may receive a short clip according to a request signal from the server 200. Here, the request signal is a signal based on information on keywords and contents included in the uttered voice of the user. In one example, the request signal may be a signal including a keyword and information about the content that the electronic device 100 is outputting. As another example, the request signal may be sent to the server 200 either in succession or concurrently with the keyword and a separate signal comprising information about the content being output by the electronic device 100.

The request signal according to an exemplary embodiment of the present disclosure may be a signal including information on contents displayed on the electronic device 100, keywords repeatedly output from the contents, information on the user of the electronic device 100. Here, the keyword repeatedly output from the content may be a keyword repeated for a predetermined number of times or more within a predetermined period of time in the content output by the electronic device 100. Hereinafter, for convenience of description, the content displayed on the electronic device 100 or the content being output is referred to as an output content.

In addition, the communicator 110 may receive a short clip from the server 200 as a response to the above-described request signal.

Specifically, when receiving a short clip request signal from the electronic device 100, the server 200 may transmit a short clip corresponding to the request signal to the electronic device 100. However, the present disclosure is not limited thereto, and the server 200 may store information on a location where the original content corresponding to the request signal is stored and time information corresponding to a short clip among the original contents. For example, the server 200 may transmit the web address for reproducing the original content and the time information corresponding to the short clip among the original contents to the electronic device 100. In this case, the electronic device 100 can access the server where the original content is stored based on the received web address, and can reproduce the section corresponding to the time information.

For example, the electronic device 100 may receive the web address from which the specific content is received from the server 200 and the time information on the section including the keyword in the specific content. In this case, the electronic device 100 accesses the received web address to receive a specific content, and can reproduce and output only a specific section of the specific content based on the time information.

The inputter 120 is configured to receive a user's uttered voice and convert it into audio data. Specifically, the inputter 120 may be implemented as a microphone and receive a user's uttered voice. However, the present disclosure is not limited thereto, and the inputter 120 may be provided in a remote control device (not shown) for controlling the electronic device 100, rather than the electronic device 100, to receive the user's uttered voice.

If the electronic device 100 is implemented as a touch-based electronic device, the inputter 120 may be implemented as a touch screen having a mutual layer structure with the touch pad. In this case, the inputter 120 may receive the keyword input through the touch screen in addition to the uttered voice.

The outputter 130 may output at least one of various contents and a short clip. Specifically, the outputter 130 may include at least one of a display and a speaker. When the outputter 130 includes a display, the outputter 130 may display various content playback screens such as images, moving pictures, texts and music, application execution screens including various contents, a web browser screen, a graphic user interface (GUI) Screen and the like can be displayed.

In this case, the display may be implemented as liquid crystal display panel (LCD) and organic light emitting diode (OLED) and so on, but is not limited thereto. In addition, the display may be implemented as a flexible display and a transparent display according to cases.

In particular, the display may display a short clip received from the server 200.

Meanwhile, when the outputter 130 according to another embodiment of the present disclosure includes only a speaker, the outputter 130 may provide the received short clip as audio through a speaker. For example, when the electronic device 100 is implemented as an audio output device that does not have a display function, the outputter 130 may provide additional information about the received short clip as audio, and provide only an audio signal of the short clip.

The processor 140 controls overall operations of the electronic device 100.

In particular, when the uttered voice of the user is received through the inputter 120, the processor 140 may transmit a signal requesting a short clip based on the keyword and contents information included in the received uttered voice to the server 200 through the communicator 110. In addition, the short clip received from the server 200 according to the request signal can be output through the outputter 130.

To be specific, the processor 140 may send information about the output content to the server 200. Here, the information on the output content include the title, genre, broadcast time, broadcasting station information, and the like of the output content. Thus, if the processor 140 sends a short clip request signal to the server 200 based on at least one of the keyword and the information about the output content, the processor 140 may receive and provide a short clip associated with the keyword and output content.

In this case, at the time when the processor 140 transmits the short clip request signal to the server 200, the short clip generated by the server 200 can be received. Here, the generated short clip may be a short clip generated from a content different from the output content. For example, it may be broadcast content that was broadcast before the output content broadcast time.

However, the present disclosure is not limited to this, and a short clip generated from the output content can also be received. According to an exemplary embodiment, when the output content is broadcast content that is received in real time, the server 200 may also receive the broadcast content. When the processor 140 transmits a request signal, if a short clip regarding the output content is created, the corresponding short clip can also be targeted. For example, if broadcast start timing is earlier than predetermined time than the timing of requesting a short clip, the short clip regarding the output content can be pre-generated.

In the meantime, the processor 140 may receive additional information about the short clip. Specifically, the processor 140 may receive and provide additional information about the short clip and the short clip from the server 200. Here, the additional information on the short clip may be information including at least one of a title, a genre of the original content of the short clip, a broadcast time of the original content, a generation time of the short clip, a broadcast station of the original content.

In addition, the processor 140 may analyze the audio signal of the output content and transmit a signal requesting a short clip related to the keyword to the server 200 based on a keyword repeated a predetermined number of times or more for a predetermined time. Accordingly, the processor 140 can acquire a repeated word in the output content as a keyword, and transmit the keyword to the server 200 to receive the associated short clip.

Also, the electronic device 100 may include a storage (not shown) for storing user information, and the processor 140 may transmit a request signal including the user information stored in the storage to the server 200. In this case, the processor 140 may receive and display a short clip associated with the user information. Here, the user information may be information on the user of the electronic device 100, including information such as age range, preferred genre, favorite content, favorite broadcasting station, and the like. Therefore, when the electronic device 100 receives a plurality of short clips from the server 200, it can receive and display a more suitable short clip to the user based on the keyword and user information.

FIG. 2B is a block diagram illustrating a detailed configuration of the electronic device 100 according to another embodiment of the present disclosure. According to FIG. 2B, the electronic device 100 includes a communicator 110, an inputter 120, an outputter 130, a processor 140, a storage 150, an audio processor 160, and a video processor 170. The detailed description of the components shown in FIG. 2B that are the same as those shown in FIG. 2A will be omitted.

The processor 140 controls the overall operation of the electronic device 100 using various programs stored in the storage 150. The processor 140 may include one or more of a central processor (CPU), a controller, an application processor (AP), a communication processor (CP), an ARM processor, or may be defined by the term. In addition, the processor 140 may be implemented as a digital signal processor (DSP), a SoC with a content processing algorithm embedded therein, or a Field Programmable Gate Array (FPGA).

To be specific, the processor 140 includes RAM 141, ROM 142, main CPU 143, graphic processor 144, the first to nth interfaces 145-1~145-n, and bus 146.

The RAM 141, the ROM 142, the main CPU 143, the graphic processor 144, and the first to nth interface 145-1~145-n can be interconnected through the bus 136, etc.

The first to nth interfaces 145-1 to 145-n are connected to the aforementioned various elements. One of the interfaces can be network interface that is connected to an external device through network.

The main CPU 143 access the storage 150 and performs booting using the O/S stored in the storage 150. By using various programs, contents, and data stored in the storage 150, various operations are performed.

The ROM 142 stores a command set for system booting. If power is supplied as the turn-on command is input, the main CPU 143 copies the O/S stored in the storage 150 to the RAM 141 according to the command stored in the ROM 142, executes the O/S to boot the system. If the booting is completed, the main CPU 143 copies various application programs stored in the storage 150 to the RAM 141 and executes the application program copied to the RAM 141 to perform an operation.

The graphic processor 144 generates a screen including various objects such as an icon, an image, and a text using an operation unit (not shown) and a rendering unit (not shown). An operation unit (not shown) calculates an attribute value such as a coordinate value, a shape, a size, and a color to be displayed by each object according to the layout of the screen based on the received control command. The rendering unit (not shown) generates screens of various layouts including the objects based on the attribute values calculated by the operation unit (not shown). The screen generated in the rendering unit (not shown) is displayed in the display area of the outputter 130.

The storage 150 stores various data such as the O/S software module to drive the electronic device 100, various multimedia contents, applications, and various contents which are input or set during execution of applications. In particular, the storage 150 may store, for example, user preference information, age group, user profile information, and so on.

The audio processor 160 is an element to perform processing of audio data. The audio processor 160 may perform decoding, amplification, and noise filtering with respect to audio data. For example, the audio processor 160 may generate and provide the feedback sound which corresponds to a case in which user preference information displayed during channel zapping satisfies a preset criteria, and so on.

The video processor 170 is an element to perform processing of video data. The video processor 170 may perform various image processing such as decoding, scaling, noise filtering, frame rate conversion, and resolution conversion with respect to video data.

Figure 3:
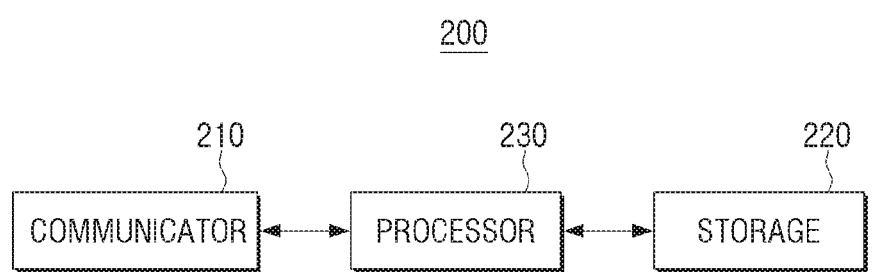
FIG. 3 is a block diagram illustrating a configuration of a server according to an exemplary embodiment.

FIG. 3 is a block diagram illustrating a configuration of a server 200 according to an exemplary embodiment.

Referring to FIG. 3, the server 200 includes a communicator 210, a storage 220, and a processor 230.

The communicator 210 performs communication with an external device in accordance with various types of communication methods.

In particular, the communicator 210 may perform communication with the content provider 300 using at least one of a wired/wireless method. Specifically, the communicator 210 can receive the content from the content provider 300. Here, the communicator 210 may include various communication chips such as a Wi-Fi chip, a Bluetooth chip, a wireless communication chip, an NFC chip, and a tuner.

The communicator 210 according to an exemplary embodiment may perform communication with the electronic device 100. To be specific, the communicator 210 may receive a short clip request signal transmitted from the electronic device 100 and transmit the short clip to the electronic device 100.

The storage 220 stores the various data such as the O/S software module to drive the server 200, various multimedia contents, applications, and various contents which are input or set during execution of applications.

In particular, the storage 200 may store an original content, a plurality of short clips generated from the original content and keywords by a plurality of short clips.

According to an embodiment of the present disclosure, when the server 200 generates a plurality of short clips by editing the original content, at least one keyword may be obtained according to the audio signals included in the plurality of short clips. In this case, the server 200 may store the short clips and the keywords obtained from the short clips in the storage 220. For example, when the audio signal included in the first short clip is analyzed to obtain the first and second keywords, the server 200 may store the first and second keywords together with the first short clip.

According to an embodiment of the present disclosure, the server 200 may group and store short clips for each keyword. In this case, short clips including the audio signal corresponding to the first keyword may be grouped and stored in the storage 220. Accordingly, if the first keyword is included in the short clip request signal received from the electronic device 100, the server 200 can transmit a plurality of short clips grouped corresponding to the first keyword to the electronic device 100.

The processor 230 controls overall operations of the server 200.

When the server 200 performs a voice recognition function according to an exemplary embodiment, the processor 230 may analyze the uttered voice received from the electronic device 100 and obtain a keyword included in the uttered voice. The server 200 may transmit a keyword to the electronic device 100.

In addition, when the original content is received through the communicator 210, the processor 230 may edit the received original content to generate a plurality of short clips. Specifically, the processor 230 may edit only a specific section of the original content based on the speech detection algorithm. Here, the voice detection algorithm means an algorithm for detecting an audio signal including at least one keyword.

For example, the processor 230 may analyze an audio signal of the original content to detect a starting point and an ending point of voice and edit a section between the start point and end point (EPD unit) to generate a short clip.

However, the present disclosure is not limited thereto, and the server 200 may be configured to transmit the short clip request signal based on a preset time interval, a specific interval set by the content provider, a time interval set by the administrator of the server 200, and edit the original content to create a short clip.

According to an exemplary embodiment, when the processor 230 determines that the voice is terminated after the first detection of a voice in the broadcast content received in real time, the processor 230 may edit the corresponding section in real time to generate a short clip. In this case, the processor 230 may determine that the voice has been terminated if no voice is detected for a predetermined time or if a mechanical noise, noise, or the like is detected for a predetermined time or more. The processor 230 may then store the generated short clip and the obtained keyword in the storage 220 together. Thus, the processor 230 may send a short clip to the electronic device 100 in response to a short clip request signal received from the electronic device 100.

Meanwhile, the server 200 according to an embodiment of the present disclosure may store the web address that can receive the original content and the time information about the section including the specific keyword in the database, instead of generating the short clip from the original content. In this case, when a short clip request signal is received from the electronic device 100, the server 200 may transmit web address for receiving an original content corresponding to the short clip request signal and section information including a specific keyword from the original content to the electronic device 100. Accordingly, the electronic device 100 may, instead of receiving a short clip from the server 200, provide a short clip through a method of outputting a section which includes a specific keyword from an original content based on web address and time information.

Hereinbelow, a short clip provision according to various exemplary embodiments of the present invention will be described. In the meantime, for convenience of description, FIGS. 4-8 will describe an exemplary embodiment in which the electronic device 100 is implemented to include a display, and an output content and a short clip are output through a display.

Figure 4:
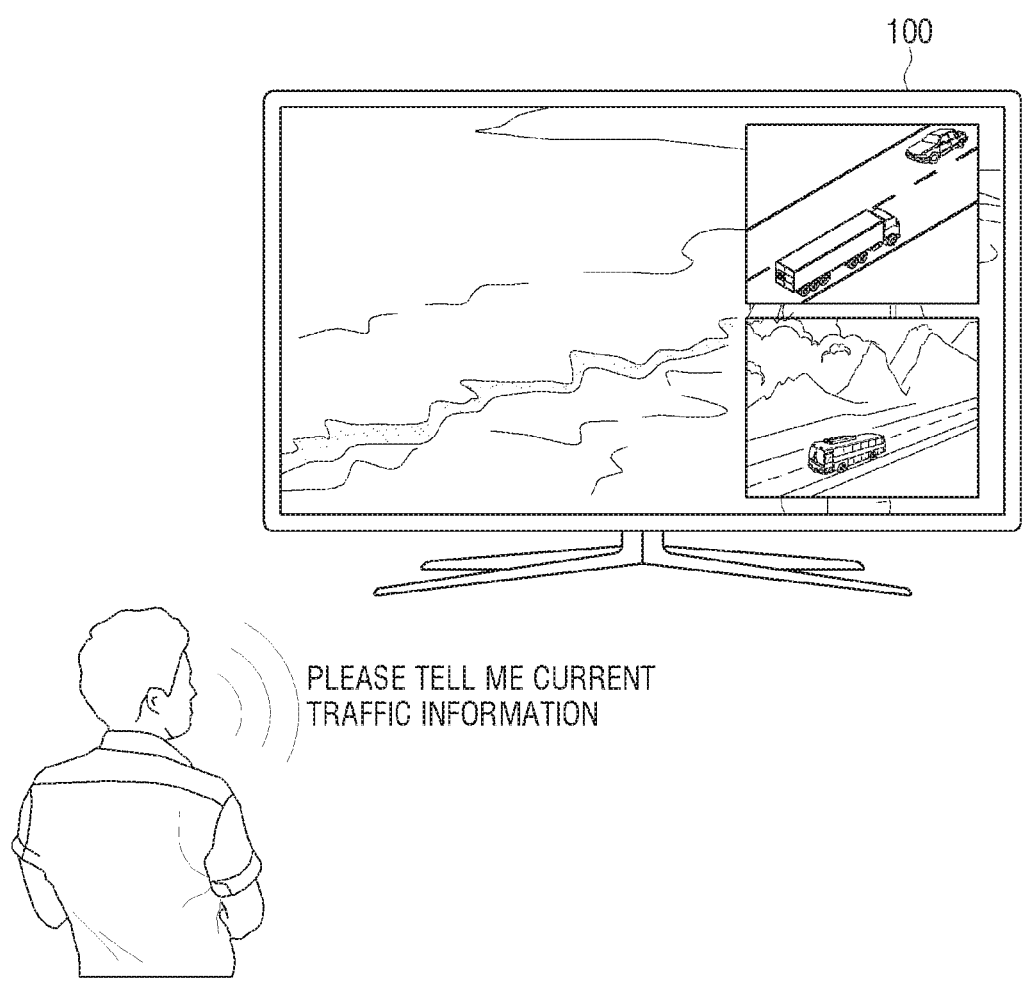
FIG. 4 is a view to describe a method for outputting a short clip relating to a keyword according to an exemplary embodiment.

FIG. 4 is a view to describe a method for outputting a short clip relating to a keyword according to an exemplary embodiment.

According to FIG. 4, the electronic device 100 may receive the uttered voice of the user. In this case, the electronic device 100 can analyze the voice uttered by the user and acquire the keyword included in the uttered voice. For example, if the received uttered voice of the user is "tell me the current traffic information", the electronic device 100 can acquire "traffic information" as a keyword. Meanwhile, it is needless to say that the electronic device 100 according to another embodiment of the present disclosure may acquire the keyword included in the uttered voice by performing communication with the voice recognition server or the server 200.

The electronic device 100 may also send a signal to the server 200 requesting a short clip for the acquired keyword. In this case, the server 200 may send a short clip for the keyword to the electronic device 100. Specifically, the server 200 may transmit a specific short clip to the electronic device 100 based on short clip and short clip specific keywords generated from the original content until receiving the request signal from the electronic device 100. For example, if the keyword included in the short clip request signal is "traffic information", the server 200 transmits only a short clip having the keyword "traffic information" to the electronic device 100. In this case, the electronic device 100 can receive a short clip having the keyword "traffic information" generated by editing a specific section of a news program transmitted from a content provider, that is, a broadcaster. Accordingly, the received short clip may be video content including an audio signal corresponding to "traffic information".

Meanwhile, according to an exemplary embodiment of the present disclosure, the electronic device 100 may transmit a short clip request signal including user information to the server 200. In this case, the server 200 may transmit a short clip related to the keyword and the user information to the electronic device 100. For example, when the location of the electronic device 100 corresponds to "Seoul" according to the user information, the server 200 selects "traffic information" and "Seoul" from among a plurality of short clips having "traffic information" as a keyword can transmit a short clip satisfying both "traffic information" and "Seoul" to the electronic device 100. Thus, the electronic device 100 can display a short clip optimized for the user among the short clips generated in real time.

Meanwhile, according to an embodiment of the present disclosure, the electronic device 100 may provide an output mode and a short clip mode. The output mode may be a mode for continuously outputting only the output content regardless of whether or not short clip reception is performed from the server 200. In addition, the short clip mode may be a mode for displaying a short clip received from the server 200. The electronic device 100 can display the short clip by switching from the output mode to the short clip mode at the end of the output content (for example, during CF broadcast). In the meantime, the present disclosure is not limited thereto, and switching between the output mode and the short clip mode may be performed in response to user input. For example, when a user's uttered voice is received in the output mode, the user can automatically switch to the short clip mode and display the short clip received from the server 200. Further, the output mode and the short clip mode may be simultaneously executed. For example, when a short clip is received from the server 200, the received short clip may overlap with the output content and be displayed in a partial area of the outputter 130.

Hereinbelow, a method for receiving a short clip based on an output content will be described.

Figure 5:
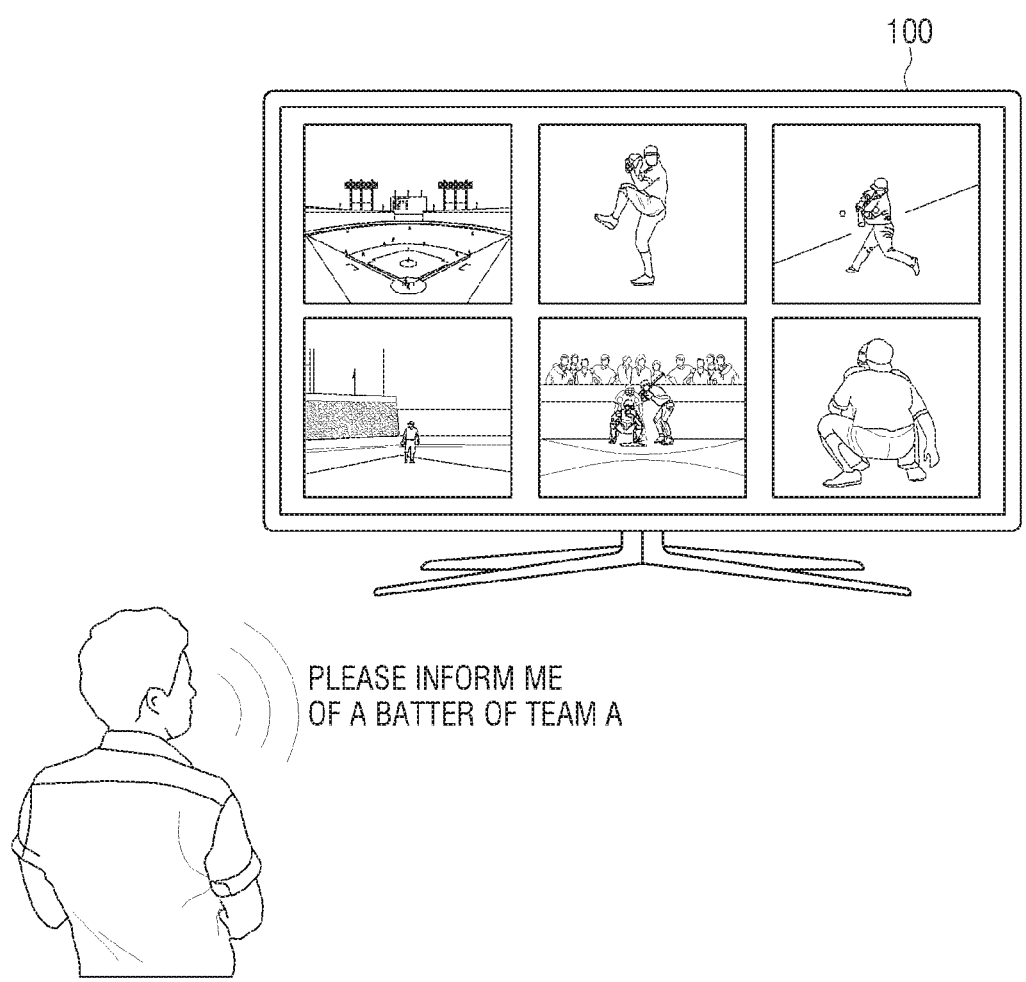
FIG. 5 is a view to describe a method for outputting a short clip relating to an output content according to an exemplary embodiment.

FIG. 5 is a view to describe a method for outputting a short clip relating to an output content according to an exemplary embodiment.

According to FIG. 5, the electronic device 100 may transmit information about the output content to the server 200 in addition to the keyword obtained from the user's uttered voice, in the short clip request signal. In this case, the server 200 may transmit a specific short clip to the electronic device 100 based on the keyword and the short clip request signal.

More specifically, the information on the output content means information on the content being output to the electronic device 100, and can be obtained from the metadata on the output content. For example, the information on the output content may include the title, genre, broadcast time, broadcast station information, and the like of the output content. However, the present disclosure is not limited thereto, and the information about the content can be acquired through various methods. For example, it is possible to receive information about a content from an external server, perform OCR on the screen, and obtain additional information.

As shown in FIG. 5, if the user's uttered voice is "Please inform me of a batter of Team A", the electronic device 100 can acquire at least one of "Team A" and "batter" as keywords. In addition, if the output content is a baseball game, the electronic device 100 may include information (e.g., "sports", "baseball") and keywords (e.g, "Team A" and 'batter") to the server 200 as a short clip request signal. In this case, the server 200 can transmit, to the electronic device 100, a short clip keyword of "sports", "baseball", "Team A" and "batter" among a plurality of short clips. Accordingly, the electronic device 100 can receive and display an interview image of the batter of Team A, sports news of Team A, and the like from the server 200. Meanwhile, as described above, the plurality of short clips received by the electronic device 100 may be video content generated by editing the specific section of the original content transmitted from the broadcasting company and received by the server 200.

Hereinbelow, a method of acquiring a keyword from an audio signal which is output from the electronic device 100 and receiving a short clip with respect to the acquired keyword will be described.

Figure 6:
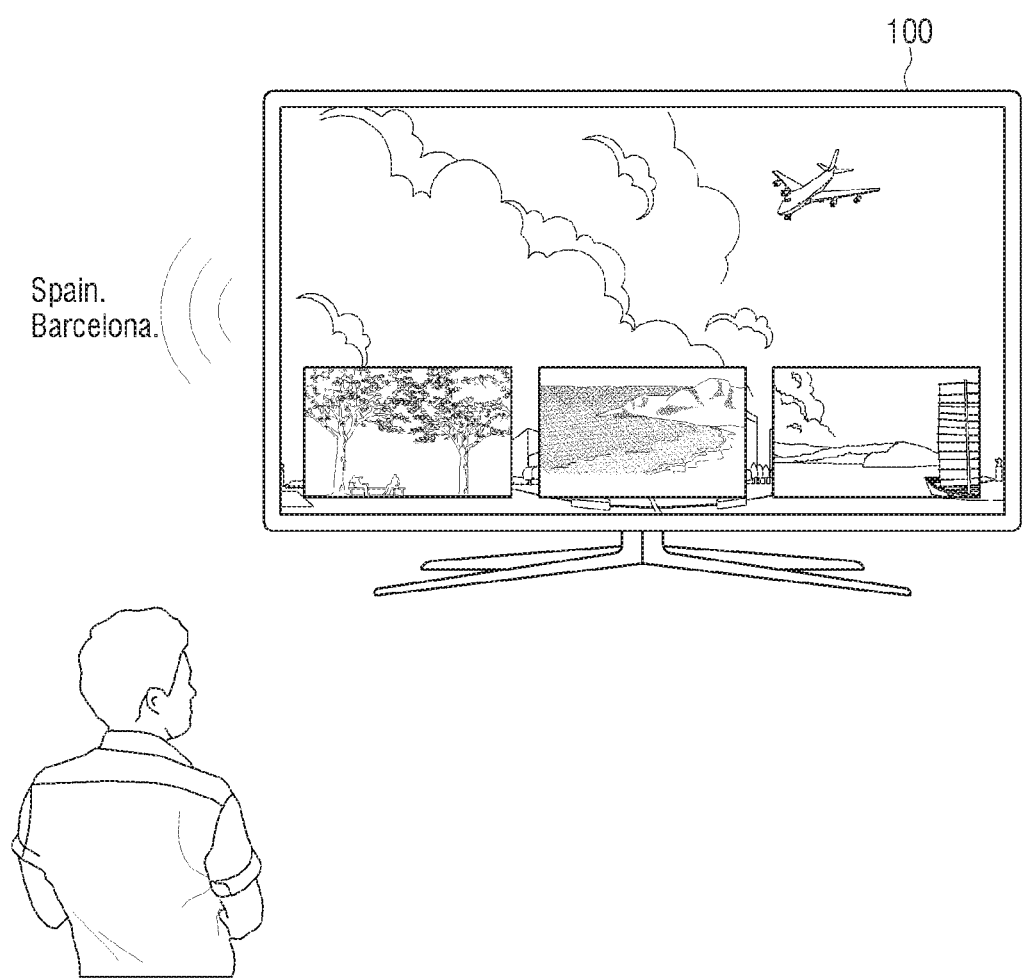
FIG. 6 is a view to describe a method for acquiring a keyword by analyzing an audio signal according to an exemplary embodiment.

FIG. 6 is a view to describe a method for acquiring a keyword by analyzing an audio signal according to an exemplary embodiment.

According to FIG. 6, a case in which the content which is output from the electronic device 100 is repeatedly output can be assumed. In this case, the electronic device 100 may, in addition to the keyword acquired form the uttered voice of the user, include the words repeatedly output from the output content to the short clip request signal and transmit the same to the server 200.

To be specific, the electronic device 100 may transmit a keyword which is repeated for more than a predetermined time for predetermined time from audio output through the speaker provided in the electronic device 100 to the server 200.

For example, if the output content is a travel information program for "Spain", the electronic device 100 can analyze the audio signal of the output content and obtain "Spain", "Barcelona". In this case, the server 200 can transmit short clips matching "Spain" and "Barcelona" among the plurality of short clips to the electronic device 100. Accordingly, the electronic device 100 can receive a short clip for "Spain" and "Barcelona" from the server 200 and display the same. Meanwhile, as described above, the electronic device 100 may transmit the short clip request information to the server 200 including the information about the output content. In this case, the electronic device 100 may receive a short clip generated by editing a specific section of the travel information program for "Spain" and "Barcelona".

In the meantime, the electronic device 100 according to an exemplary embodiment may display the short clip received from the server 200 as a thumbnail image. In this case, a short clip which corresponds to a thumbnail image according to a user's input can be reproduced.

Hereinbelow, a specific method of displaying a short slip on the electronic device 100 will be described.

Figure 7:
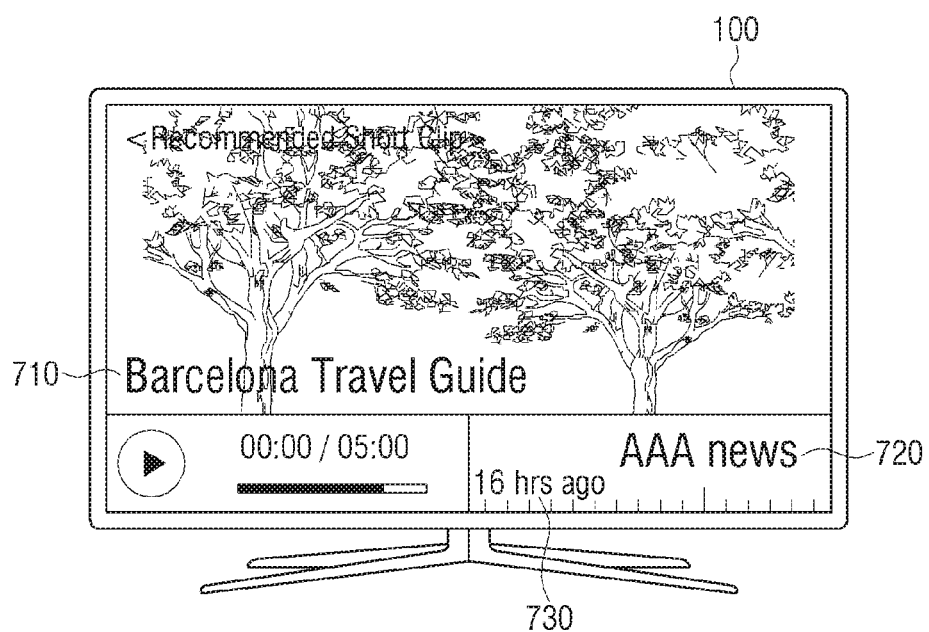
FIG. 7 is a view to describe additional information regarding a short clip according to an exemplary embodiment.

FIG. 7 is a view to describe additional information regarding a short clip according to an exemplary embodiment.

According to FIG. 7, the electronic device 100 may additionally receive information regarding a short clip from the server 200 and provide the received information along with the short clip.

More specifically, the additional information about the short clip includes at least one of the title 710 of the original content, the genre, the broadcast time 720 of the original content, the broadcast station information 730 of the original content, the generation time of the short clip. Here, the broadcast time of the original content may mean a time when the server 200 received the content from the content provider 300, a generation time of the original content, a time when the original content was transmitted from the broadcasting station, and the like. In addition, the keyword of the short clip may mean a keyword that matches the keyword included in the short clip request signal among at least one keyword matched to the short clip.

As shown in FIG. 7, the additional information on the short clip can be displayed when the short clip selected in accordance with the user's input is reproduced. However, the present disclosure is not limited thereto, and it is needless to say that the electronic device 100 may display a plurality of short clips received from the server 200 as a thumbnail image and simultaneously display additional information about the short clip.

Hereinbelow, a method for displaying additional response information with respect to a keyword included in the uttered voice of a user will be described.

Figure 8:
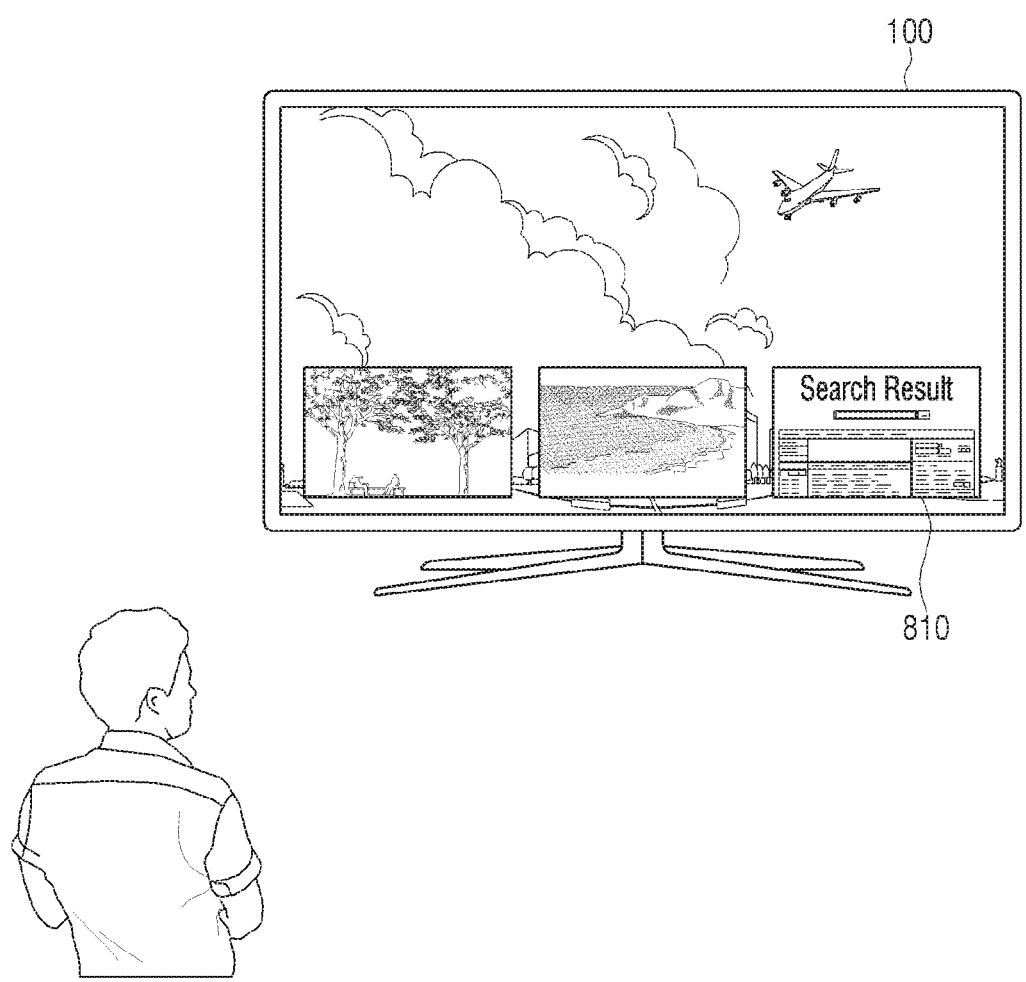
FIG. 8 is a view to describe additional response information which is provided along with a short clip according to an exemplary embodiment.

FIG. 8 is a view to describe additional response information which is provided along with a short clip according to an exemplary embodiment.

Referring to FIG. 8, the electronic device 100 can receive, from an external server, additional response information for a keyword obtained from a user's uttered voice and display it together with a short clip. Here, the additional response information may include a search result 810 for the keyword, information about the keyword, and the like. However, the present disclosure is not limited thereto, and it is possible to receive and display additional response information on at least one of the information on the output content, the user information, and the repeated keywords in the output content from the external server.

For example, a search result that a genre of an output content is a keyword can be received from an external server and displayed along with a short clip. In addition, the search result that a keyword obtained from the uttered voice of a user and a genre of the output content are combined can be received from an external server and displayed.

Figure 9:
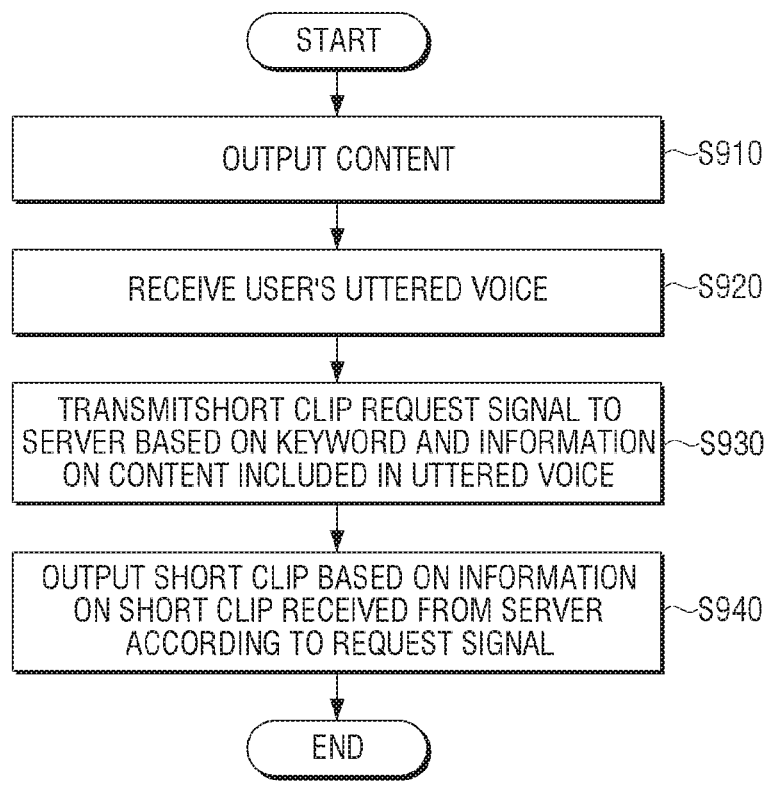
FIG. 9 is a flowchart to describe a method for providing a short clip according to an exemplary embodiment.

FIG. 9 is a flowchart to describe a method for providing a short clip according to an exemplary embodiment.

According to a control method of the electronic device as illustrated in FIG. 9, a content is output first (S910).

Then, an uttered voice of a user is received (S920).

Then, when an uttered voice is received, a short clip request signal is transmitted to the server based on the keyword and contents information included in the received uttered voice (S930).

A short clip is output based on information regarding the short clip received from the server according to a request signal (S940).

Herein, the information on the short clip includes at least one of a position where the short clip is stored and a time section including the keyword. In step S940, when information on the short clip is received from the server according to the request signal, it is possible to output a short clip based on the information.

In addition, each of a plurality of short clips can be a video content or an audio content which is generated by editing a part which includes a specific keyword from a specific content.

Further, in step S940, when additional information on the short clip is received, additional information on the short clip is provided. Here, the information on the short clip may include the title of the original content, the genre, the broadcast time of the original content, broadcasting station information of an original content, and a keyword.

In addition, in S940, additional information regarding a short clip can be provided as audio through a speaker.

In addition, the electronic device may include at least one of a display and a speaker. In step S930, a signal requesting a short clip related to a keyword can be additionally transmitted to a server based on a keyword which is repeated for more than a predetermined times for predetermined time from audio which is output through a speaker.

In S940, based on the keyword included in the received uttered voice, additional response information regarding the uttered voice can be provided along with the short clip.

In step S930, a request signal including a keyword and user information is transmitted to the server. In step S940, a short clip related to the keyword and the regular user information may be received from the server and output.

In step S930, the received uttered voice can be transmitted to the voice recognition server or the aforementioned server, and the short clip request signal may be transmitted to the server based on the keyword and the information on the content received from the voice recognition server or the server.

Figure 10:
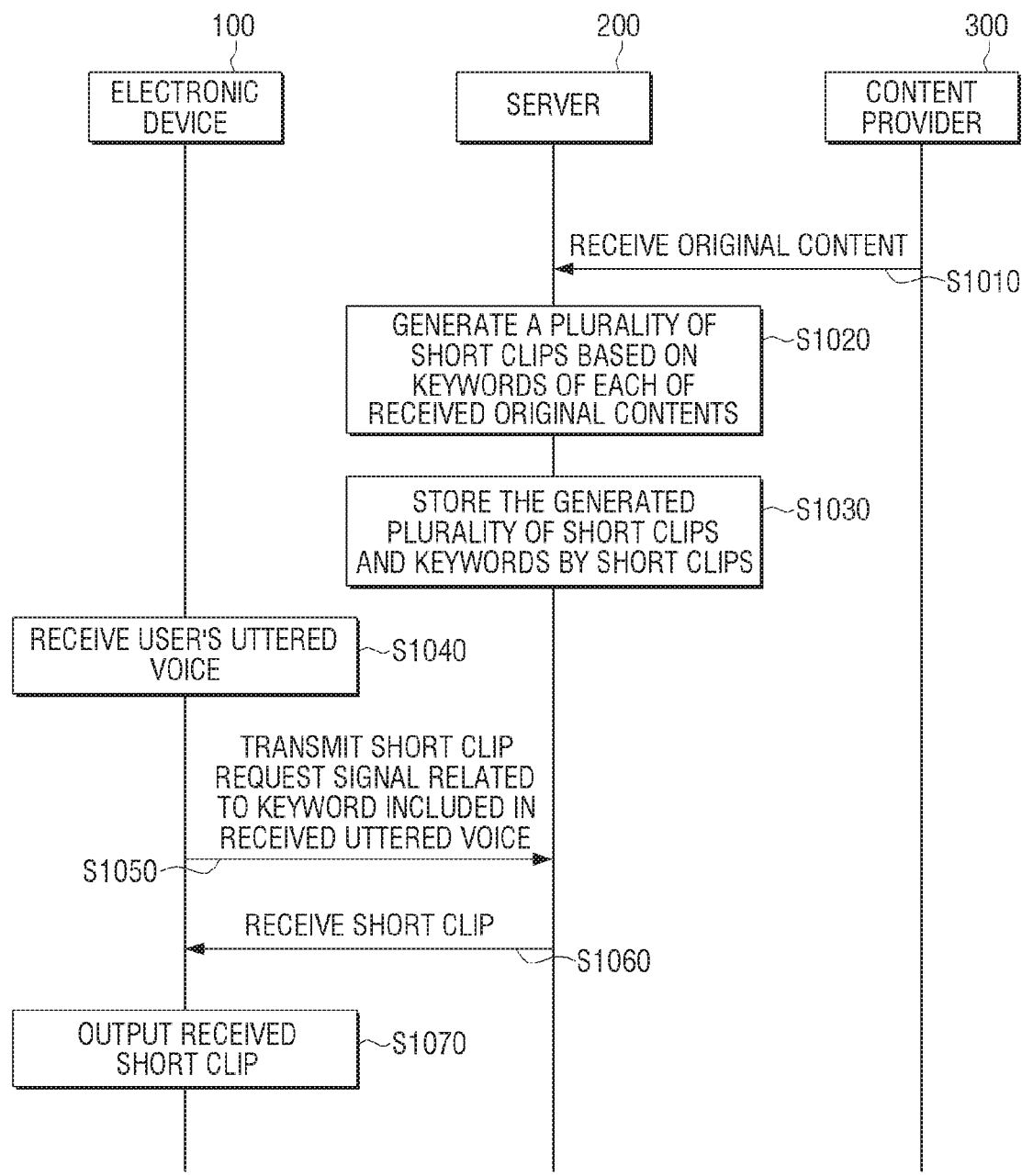
FIG. 10 is a flowchart to describe a system for providing a short clip according to an exemplary embodiment.

FIG. 10 is a flowchart to describe a system for providing a short clip according to an exemplary embodiment.

According to FIG. 10, first, the server 200 receives contents from the contents provider 300 (S1010). Hereinafter, the content received from the content provider 300 is referred to as an original content. In the meantime, the server 200 can receive the content from the content provider 300 in real time. If the content provider 300 is a broadcasting station, the server 200 can receive the broadcasting program transmitted in real time from the broadcasting station as original contents.

Then, the server 200, based on keywords of the received original contents, generates a plurality of short clips (S1020).

The server 200 stores the generated plurality of short clips and keywords by short clips (S1030).

In the meantime, the electronic device 100 receives user's uttered voice (S1040).

Then, a short clip request signal related to a keyword included in the received uttered voice is transmitted to the server 200 (S1050).

The electronic device 100 receives a short clip from a server (S1060).

Then, the electronic device 100 outputs the received short clip (S1070).

Hereinbelow, when the electronic device 100 does not have a display function, a method for providing a short clip through a speaker will be described.

Figure 11:
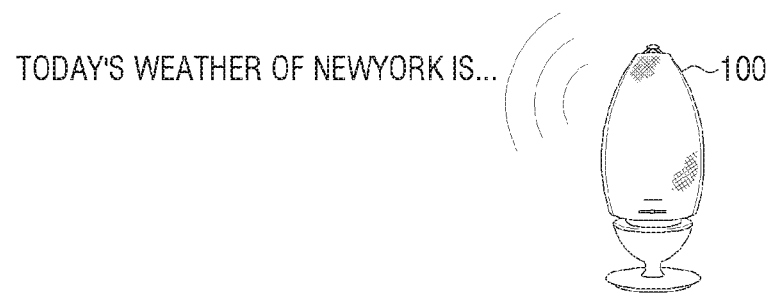
FIG. 11 is a view to describe a method that an electronic device provides a short clip through a speaker according to another exemplary embodiment.
Figure 11:

FIG. 11 is a view to describe a method that an electronic device provides a short clip through a speaker according to another exemplary embodiment.

According to FIG. 11, the electronic device 100 may be provided with a speaker as an outputter, and no display may be provided. In this case, the electronic device 100 can output an audio signal of a short clip from the server 200 and provide the same. As an example, if the short clip contains both the video signal and the audio signal as video content, the electronic device 100 may provide only the audio signal in the received short clip.

As shown in FIG. 11, when "please inform current weather" is received as a uttered voice, a short clip having "current weather" as a keyword can be provided. In this case, the location information of the electronic device 100 may be additionally received as described above to provide a short clip for the current weather in the specific area (e.g., current weather in New York). In addition, since the electronic device 100 may not have a display, only the audio signal of the received short clip may be output.

Further, when the additional information on the short clip is received as described above, additional information on the short clip can be converted into an audio signal and provided. For example, when additional information about the short clip and the short clip is received from the server 200, additional information on the short clip may be output first, and the audio signal included in the short clip may be sequentially output.

The electronic device 100 according to an embodiment of the present invention may output only a part of the additional information about the received short clip as audio. For example, when the title, genre, and broadcast time of the original content are received as additional information about the short clip, the electronic device 100 provides only the title of the original content as an audio signal, and output the audio signal of the received short clip.

In addition, the electronic device 100 according to an embodiment of the present invention can sequentially provide a plurality of short clips based on a predetermined priority when a plurality of short clips are received from the server 200. For example, the electronic device 100 can output audio signals included in a plurality of short clips through a speaker in accordance with a generation sequence of a short clip.

Therefore, a user, even the electronic device does not have a display function, may receive a short clip and additional information regarding the short clip as an audio signal.

The methods according to various exemplary embodiments can be implemented as software installable in the conventional electronic device and server, program, or applications.

In addition, the methods according to the exemplary embodiments can be implemented only by software upgrade of the conventional electronic device or server, or hardware upgrade.

Meanwhile, the method of controlling an electronic device according to various embodiments of the present invention described above may be implemented as a computer-executable program code and provided to each server or device such that it is stored in the non-transitory computer readable medium and executed by the processor.

In addition, the method of controlling an electronic device according to various embodiments of the present invention described above may be implemented as a computer program product including a computer readable medium including a computer readable program executed by a computer device. The computer-readable program may also be stored in a computer-readable storage medium at a server, and the program may be embodied in a form downloadable via a network to a computer device.

A non-transitory readable medium is not a medium for storing data for a short time such as a register, a cache, a memory, etc., but means a medium that semi-permanently stores data and can be read by a device. In particular, the various applications or programs described above may be stored and provided on non-volatile readable media such as CD, DVD, hard disk, Blu-ray disk, USB, memory card, ROM.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:

1. An electronic device comprising:
a communication interface including circuitry configured to communicate with a server for storing information on a plurality of clips and keywords associated with the plurality of clips, wherein the clips comprise audio content and the keywords are contained in audio content of the clips;
a speaker;
a microphone; and
a processor configured to:
in response to receiving a user's uttered voice through the microphone, obtain a keyword included in the received uttered voice;
control the communication interface to transmit a clip request signal to the server based on the keyword and information regarding a content output by the speaker;
control the communication interface to receive from the server clip information regarding a clip based on the request signal; and
control the speaker to output the clip based on the received clip information
wherein the clip information includes time information associated with occurrence of the keyword in the audio content of the clip.

2. The electronic device of claim 1, wherein the received clip information further includes location information on a location at which the clip is stored.

3. The electronic device of claim 1, wherein each of the plurality of clips comprises one or both of video content and audio content generated by editing original content based on specific keywords.

4. The electronic device of claim 1, wherein the processor is configured to, in response to receiving additional information regarding the clip, control the speaker to output additional information regarding the clip, the additional information including at least one of a title and a genre of original content associated with the clip, broadcast time of the original content, generation time of the clip, broadcaster information of the original content, or the keyword.

5. The electronic device of claim 1, further comprising a display.

6. The electronic device of claim 1, wherein the processor is configured to control the speaker to output additional information.

7. The electronic device of claim 1, wherein the clip request signal is further based on a keyword which is repeated a predetermined times or more during a predetermined time in audio output by the speaker.

8. The electronic device of claim 1, wherein the communication interface further receives from the server additional response information based on the request signal and the processor is configured to control the speaker to output the additional response information.

9. The electronic device of claim 1, wherein the request signal includes the keyword and user information and the communication interface receives from the server the clip information and the user information.

10. The electronic device of claim 1, wherein the keyword is obtained by controlling the communication interface to transmit the received uttered voice to a voice recognition server or to the server, and to receive the keyword from the voice recognition server or the server.

11. The electronic device of claim 1, wherein the processor is configured to process the received uttered voice to obtain the keyword.

12. The electronic device of claim 1, wherein the processor is configured to, based on receiving the clip information, switch the output device from outputting the content to outputting the clip.

13. The electronic device of claim 1, wherein the processor is configured to, based on receiving the clip information, control the output device to simultaneously output the content and the clip.

14. The electronic device of claim 1, wherein the clip request signal further comprises location information regarding a location of the electronic device.

15. A method of controlling an electronic device which communicates with a server for storing information on a plurality of clips and keywords associated with the plurality of short clips, wherein the clips comprise audio content and the keywords are contained in audio content of the clips, the method comprising:
outputting, by a speaker, content;
receiving, by a microphone, a user's uttered voice;
in response to receiving the uttered voice, obtaining a keyword included in the received uttered voice;
transmitting a clip request signal to the server based on the keyword and information regarding the content output by the speaker;
receiving from the server clip information regarding a clip based on the request signal; and
outputting, by the speaker, the clip based on the received clip information, wherein the clip information includes time information associated with occurrence of the keyword in the audio content of the clip.

16. The method of claim 15, wherein the received clip information includes at least one of location information on a location at which the clip is stored and time information associated with occurrence of the keyword in the audio content of the clip.

17. The method of claim 15, wherein each of the plurality of clips comprises one or both of video content and audio content generated by editing original content based on specific keywords.

18. The method of claim 15, wherein, in response to receiving additional information regarding the clip, outputting additional information regarding the clip, the additional information including at least one of a title and a genre of original content associated with the clip, broadcast time of the original content, generation time of the clip, broadcaster information of the original content, or the keyword.

19. The method of claim 18, wherein the outputting of the clip comprises outputting the additional information by the speaker.

20. A non-transitory computer readable medium for an electronic device storing a program which, when executed by a processor of an electronic device, causes the processor to:
- in response to receiving a user's uttered voice through a microphone of the electronic device, obtain a keyword included in the received uttered voice;
- control a communication circuit of the electronic device to transmit a clip request signal to a server based on the keyword and information regarding content output by a speaker, the server for storing information on a plurality of clips and keywords associated with the plurality of clips, wherein the clips comprise audio content and the keywords are contained in audio content of the clips;
- control the communication circuit to receive from the server clip information regarding a clip based on the request signal; and
- control a speaker of the electronic device to output the clip based on the received clip information, wherein the clip information includes time information associated with occurrence of the keyword in the audio content of the clip.

* * * * *